(12) United States Patent
Erivantcev et al.

(10) Patent No.: US 11,009,964 B2
(45) Date of Patent: May 18, 2021

(54) LENGTH CALIBRATION FOR COMPUTER MODELS OF USERS TO GENERATE INPUTS FOR COMPUTER SYSTEMS

(71) Applicant: Finch Technologies Ltd., Tortola (VG)

(72) Inventors: Viktor Vladimirovich Erivantcev, Ufa (RU); Alexander Sergeevich Lobanov, Ufa (RU); Alexey Ivanovich Kartashov, Moscow (RU); Daniil Olegovich Goncharov, Ufa (RU); Ratmir Rasilevich Gubaidullin, Ufa (RU); Alexey Andreevich Gusev, Ufa (RU)

(73) Assignee: Finch Technologies Ltd., Tortola (VG)

( * ) Notice: Subject to any disclaimer, the term of this patent is extended or adjusted under 35 U.S.C. 154(b) by 26 days.

(21) Appl. No.: 16/433,619

(22) Filed: Jun. 6, 2019

(65) Prior Publication Data
US 2020/0387227 A1    Dec. 10, 2020

(51) Int. Cl.
*G06F 3/01* (2006.01)
*G02B 27/00* (2006.01)
*G02B 27/01* (2006.01)
*G06T 7/70* (2017.01)

(52) U.S. Cl.
CPC ......... *G06F 3/017* (2013.01); *G02B 27/0093* (2013.01); *G02B 27/0172* (2013.01); *G06F 3/011* (2013.01); *G06T 7/70* (2017.01); *G02B 2027/0138* (2013.01)

(58) Field of Classification Search
CPC . G06F 3/017; G06F 3/011; G06T 7/70; G02B 27/0093; G02B 27/0172; G02B 2027/0138
See application file for complete search history.

(56) References Cited

U.S. PATENT DOCUMENTS

| 8,659,658 | B2 * | 2/2014 | Vassigh | G06F 3/011 |
| | | | | 348/143 |
| 10,535,019 | B2 * | 1/2020 | Baracaldo Angel | H04M 3/436 |
| 10,835,333 | B2 * | 11/2020 | Hashimoto | B25J 9/1641 |
| 10,887,125 | B2 * | 1/2021 | Rexach | H04L 12/2816 |
| 2003/0105470 | A1 * | 6/2003 | White | A61B 90/06 |
| | | | | 606/102 |

(Continued)

*Primary Examiner* — Sejoon Ahn
(74) *Attorney, Agent, or Firm* — Greenberg Traurig

(57) ABSTRACT

A system including a plurality of sensor modules, each module having an inertial measurement unit (IMU) and being attached to a respective body portion of a user (e.g., upper arm, hand, and/or head) to measure the current orientation of the corresponding portion of the user. A computing device coupled to the sensor modules is configured to identify that a user is at a predefined pose, which the predefined pose of the user is representative of the forearms and the upper arms of the user lying in a horizontal plane. A head mount display (HMD) attached to a head of the user using a camera to generate camera data, the HMD calculating the first length using the camera data, and the first length is calculated as corresponds to a distance between hands of the user and shoulders of the user; the computing device determining one or more lengths of one or more bones of the user based on the first length and the plurality of orientations of arm bones of the user at the predefined pose.

19 Claims, 5 Drawing Sheets

(56) References Cited

U.S. PATENT DOCUMENTS

| | | | | |
|---|---|---|---|---|
| 2003/0116698 A1* | 6/2003 | Hayashi | ............ | B60R 21/01538 |
| | | | | 250/221 |
| 2008/0262772 A1* | 10/2008 | Luinge | .................. | A61B 5/1114 |
| | | | | 702/94 |
| 2010/0281438 A1* | 11/2010 | Latta | ....................... | G06F 3/017 |
| | | | | 715/863 |
| 2010/0295783 A1* | 11/2010 | El Dokor | ........... | G06K 9/00335 |
| | | | | 345/158 |
| 2011/0304632 A1* | 12/2011 | Evertt | ..................... | G06F 3/017 |
| | | | | 345/474 |
| 2012/0293692 A1* | 11/2012 | Namie | .................. | H04N 7/142 |
| | | | | 348/241 |
| 2014/0057675 A1* | 2/2014 | Meyers | ................ | G06F 3/0304 |
| | | | | 455/556.1 |
| 2014/0379293 A1* | 12/2014 | Sato | .................... | A61B 5/1122 |
| | | | | 702/141 |
| 2016/0256082 A1* | 9/2016 | Ely | ..................... | A61B 5/0015 |
| 2016/0350589 A1* | 12/2016 | Chiu | ...................... | B25J 13/00 |
| 2016/0378204 A1* | 12/2016 | Chen | ...................... | G06F 3/011 |
| | | | | 345/156 |
| 2018/0192897 A1* | 7/2018 | Mori | ..................... | A61B 5/022 |
| 2018/0199995 A1* | 7/2018 | Odermatt | ............... | A61B 6/505 |
| 2019/0000561 A1* | 1/2019 | Decker | ................... | A61B 6/12 |
| 2019/0179512 A1* | 6/2019 | Gordon | .............. | G06F 3/04817 |

* cited by examiner

US 11,009,964 B2

LENGTH CALIBRATION FOR COMPUTER MODELS OF USERS TO GENERATE INPUTS FOR COMPUTER SYSTEMS

RELATED APPLICATIONS

The present application relates to U.S. patent application Ser. No. 15/787,555, filed Oct. 18, 2017 and entitled "Tracking arm movements to generate inputs for computer systems," U.S. patent application Ser. No. 15/864,860, filed Jan. 8, 2018 and entitled "Tracking Torso Leaning to Generate Inputs for Computer Systems", U.S. patent application Ser. No. 15/492,915, filed Apr. 20, 2017 and entitled "Devices for Controlling Computers based on Motions and Positions of Hands", the entire disclosures of which applications are hereby incorporated herein by reference.

FIELD OF THE TECHNOLOGY

The embodiments disclosed herein relate to computer input devices in general and more particularly but not limited to input devices for virtual reality and/or augmented/mixed reality applications implemented using computing devices, such as mobile phones, smart watches, similar mobile devices, and/or other devices.

BACKGROUND

U.S. Pat. App. Pub. No. 2014/0028547 discloses a user control device having a combined inertial sensor to detect the movements of the device for pointing and selecting within a real or virtual three-dimensional space.

U.S. Pat. App. Pub. No. 2015/0277559 discloses a finger-ring-mounted touchscreen having a wireless transceiver that wirelessly transmits commands generated from events on the touchscreen.

U.S. Pat. App. Pub. No. 2015/0358543 discloses a motion capture device that has a plurality of inertial measurement units to measure the motion parameters of fingers and a palm of a user.

U.S. Pat. App. Pub. No. 2007/0050597 discloses a game controller having an acceleration sensor and a gyro sensor. U.S. Pat. No. D772,986 discloses the ornamental design for a wireless game controller.

Chinese Pat. App. Pub. No. 103226398 discloses data gloves that use micro-inertial sensor network technologies, where each micro-inertial sensor is an attitude and heading reference system, having a tri-axial micro-electromechanical system (MEMS) micro-gyroscope, a tri-axial micro-acceleration sensor and a tri-axial geomagnetic sensor which are packaged in a circuit board. U.S. Pat. App. Pub. No. 2014/0313022 and U.S. Pat. App. Pub. No. 2012/0025945 disclose other data gloves.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

At least some embodiments disclosed herein computes the lengths of some parts of a user using measurements generated by sensor modules when the user is in a predefined calibration pose, such as the lengths of the forearms and upper arms of the user. The computed lengths can be used to calibrate a computer model of the user in generating inputs to control a computer system. The sensor modules can include inertial measurement units (IMUs) attached to hands, arms and/or the head of the user. When in the predefined calibration pose, the user raises arms in front of the torso of the user to a substantially horizontal position; and the left arm and the right arm are positioned in positions that are symmetric with respective to left and right relative to a center plane of the user. A camera mounted in a head mount display can be used to capture images to determine the length between hands of the user and shoulders of the user. The IMUs can generate measurements to determine the orientations of the hands, upper arms, upper arms, and/or the head of the user. The lengths of the forearms and upper arms of the user can be estimated or computed from the length between hands of the user and shoulders of the user, the orientations of the hands, upper arms, upper arms, and/or the head of the user.

Figure 1:
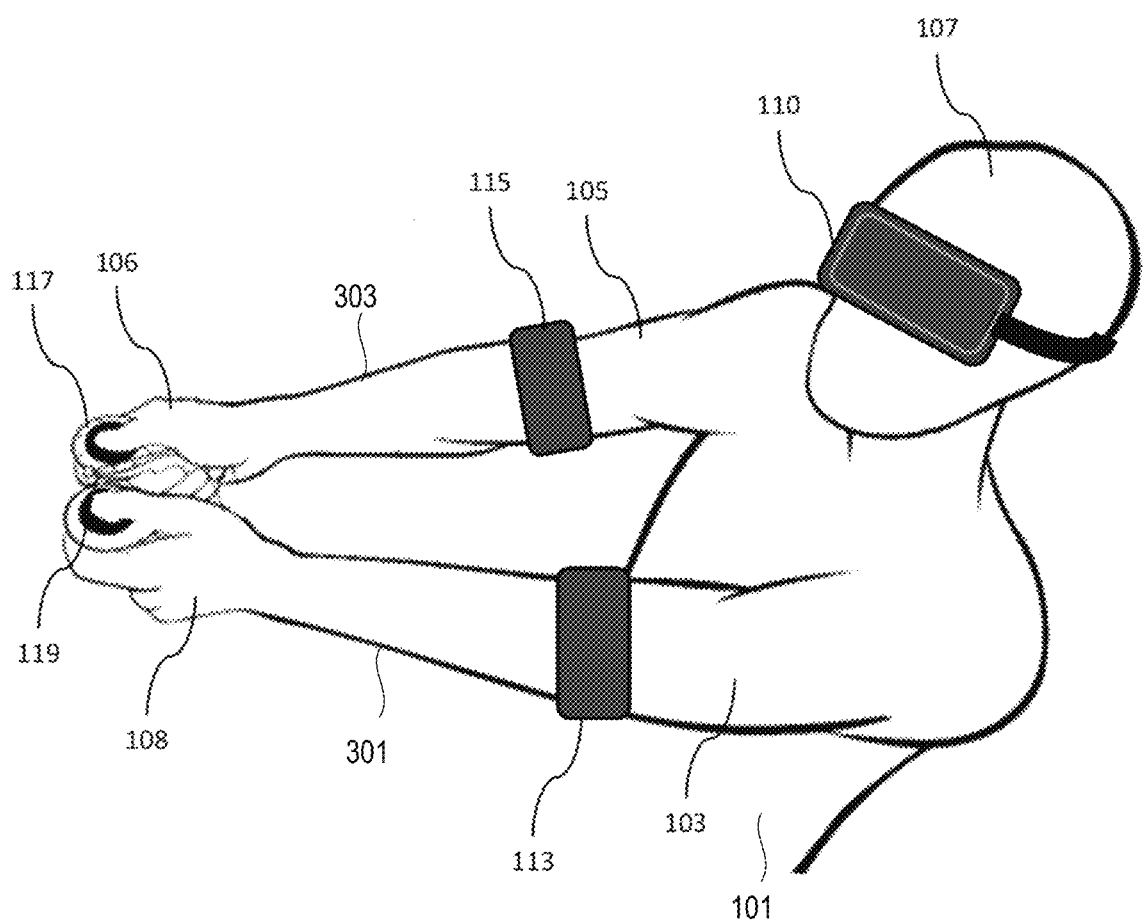
FIG. 1 illustrates a system to measure lengths according to one embodiment.

FIG. 1 illustrates a system to determine bones length according to one embodiment.

In FIG. 1, a user wears a number of sensor devices or modules (110, 113, 115, 117 and 119) that track the orientations of portions of the user, such as the head (107), the upper arms (103 and 105), and the hands (106 and 108).

The sensor devices (110-119) communicate their movement measurements to a computing device (141). In some implementations, each of the sensor devices (110-119) communicates its measurements directly to the computing device (141) in a way independent from the operations of other sensor devices.

Alternative, one of the sensor devices (110-119) can function as a base unit that receives measurements from one or more other sensor devices and transmit the bundled and/or combined measurements to the computing device (141).

Preferably, wireless connections made via a personal area wireless network (e.g., Bluetooth connections), or a local area wireless network (e.g., Wi-Fi connections) are used to facilitate the communication from the sensor devices (110-119) to the computing device (141).

Alternatively, wired connections can be used to facilitate the communication among some of the sensor devices (110-119) and/or with the computing device (141).

For example, a hand module (117 or 119) attached to or held in a corresponding hand (106 or 108) of the user can receive the motion measurements of a corresponding arm module (115 or 113) and transmit the motion measurements of the corresponding hand (106 or 108) and the corresponding upper arm (105 or 103) to the computing device (141). Further, the hand module (e.g., 117) can combine its measurements with the measurements of the corresponding arm module (115) to compute the orientation of the forearm connected between the hand (106) and the upper arm (105), in a way as disclosed in U.S. patent application Ser. No. 15/787,555, filed Oct. 18, 2017, entitled "Tracking Arm Movements to Generate Inputs for Computer Systems" and published as U.S. Pat. App. Pub. No. 2018/0335855, the entire disclosure of which is hereby incorporated herein by reference.

For example, the hand modules (117 and 119) and the arm modules (115 and 113) can be each respectively implemented via a base unit (or a game controller) and an arm/shoulder module discussed in U.S. patent application Pub. Ser. No. 15/492,915, filed Apr. 20, 2017, entitled "Devices for Controlling Computers based on Motions and Positions of Hands" and published as U.S. Pat. App. Pub. No. 2017/0308165, the entire disclosure of which is hereby incorporated herein by reference.

In some implementations, the head module (110) is configured as a base unit that receives the motion measurements from the hand modules (117 and 119) and the arm modules (115 and 113) and bundles the measurement data for transmission to the computing device (141). In some instances, the computing device (141) is implemented as part of the head module (110). The head module (110) can further determine a length calculated using camera data generated by the camera of the head module. For example, when the user is in a calibration pose illustrated in FIG. 1, the head module (110) can use a camera attached to the head module or mounted in the head module (110) to capture images of characteristic points of the hand modules (117 and 119) to calculate a distance from a center point between the left hand (108) and the right hand (106) of the user to a center point between a left shoulder and a right shoulder of the user.

When the user is at the calibration pose as illustrated in FIG. 1, the orientations of the hands of the user, the orientation of the upper arms of the user, and/or the orientation of the head of the user can be determined from the IMU measurements generated in the sensor modules 117, 119, 115, 113, and/or 110. The computing device (141) can further determine the length of the forearms and upper arms of the user from the length between hands of the user and shoulders of the user and orientations of the hands and upper arms, as further discussed below.

Figure 2:
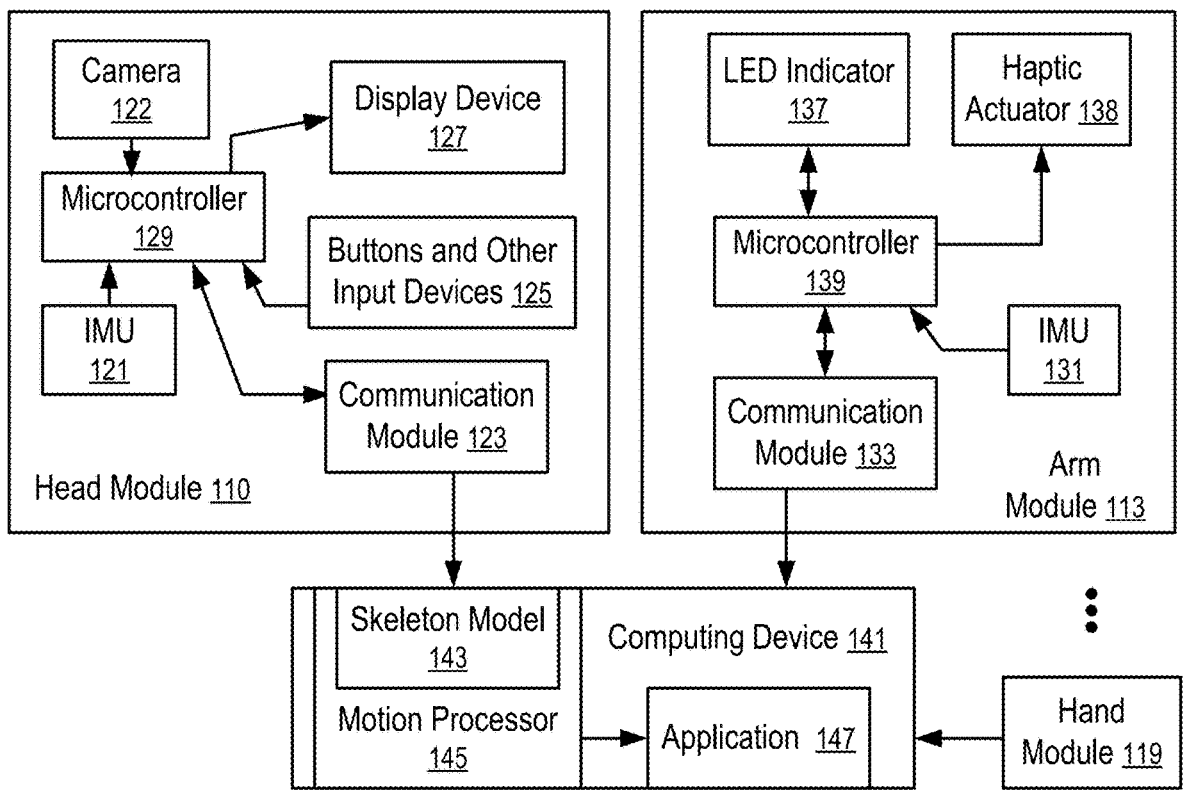
FIG. 2 illustrates a system to control computer operations according to one embodiment.

FIG. 2 illustrates a system to control computer operations according to one embodiment. For example, the system of FIG. 2 can be implemented via attaching the arm modules (115, 113) to the upper arms (105 and 103) respectively and optionally, the head module (110) to the head (107), in a way illustrated in FIG. 1.

In FIG. 2, the head module (110) and the arm module (113) have micro-electromechanical system (MEMS) inertial measurement units (IMUs) (121 and 131) that measure motion parameters and determine orientations of the head (107) and the upper arm (103). Similarly, the hand module (119) can also have its IMU.

In some implementations, the head module (110) has a camera (122) to generate the camera data. The camera data can be used to calculate the length between hands and shoulders of the user at the calibration pose. Once the length was known, the skeleton model (143) can further calculate other bones lengths of the user based on the length between hands and shoulders of the user and orientations. The positions of various points can be calculated from the combinations of the orientations and the lengths, such as the positions of the hands and joints. The positions can be used to generate gesture inputs.

Each of the IMUs (131, 121) has a collection of sensor components that enable the determination of the movement, position and/or orientation of the respective IMU along a number of axes. Examples of the components are: a MEMS accelerometer that measures the projection of acceleration (the difference between the true acceleration of an object and the gravitational acceleration); a MEMS gyroscope that measures angular velocities; and a magnetometer that measures the magnitude and direction of a magnetic field at a certain point in space. In some embodiments, the IMUs use a combination of sensors in three and two axes (e.g., without a magnetometer).

The computing device (141) has a motion processor (145), which includes a skeleton model (143) of the user. The motion processor (145) controls the movements of the corresponding parts of the skeleton model (143) according to the movements/orientations of the upper arms (103 and 105) measured by the arm modules (113 and 115), the movements/orientation of the head (107) measured by the head module (110), the movements/orientations of the hand (106 and 108) measured by the hand modules (117 and 119), etc.

The skeleton model (143) is controlled by the motion processor (145) to generate inputs for an application (147) running in the computing device (141). For example, the skeleton model (143) can be used to control the movement of an avatar/model of the arms (105 and 103), the hands (106 and 108), the head (107), and the torso (101) of the user of the computing device (141) in a video game, a virtual reality, a mixed reality, or augmented reality, etc.

Preferably, the arm module (113) has a microcontroller (139) to process the sensor signals from the IMU (131) of the arm module (113) and a communication module (133) to transmit the motion/orientation parameters of the arm module (113) to the computing device (141). Similarly, the head module (110) has a microcontroller (129) to process the sensor signals from the IMU (121) of the head module (110) and a communication module (123) to transmit the motion/orientation parameters of the head module (110) to the computing device (141).

Optionally, the arm module (113) and the head module (110) have LED indicators (137 and 127) respectively to indicate the operating status of the modules (113 and 110).

Optionally, the arm module (113) has a haptic actuator (138) respectively to provide haptic feedback to the user.

Optionally, the head module (110) has a display device (127) and/or buttons and other input devices (125), such as a touch sensor, a microphone, a camera, etc.

In some implementations, the head module (110) is replaced with a module that is similar to the arm module (113) and that is attached to the head (107) via a strap or is secured to a head mount display device.

In some applications, the hand module (119) can be implemented with a module that is similar to the arm module (113) and attached to the hand via holding or via a strap. Optionally, the hand module (119) has buttons and other input devices, such as a touch sensor, a joystick, etc.

For example, the handheld modules disclosed in U.S. patent application Ser. No. 15/792,255, filed Oct. 24, 2017, entitled "Tracking Finger Movements to Generate Inputs for Computer Systems" and published as U.S. Pat. App. Pub. No. 2018/0335843, U.S. patent application Ser. No. 15/787,555, filed Oct. 18, 2017, entitled "Tracking Arm Movements to Generate Inputs for Computer Systems" and published as U.S. Pat. App. Pub. No. 2018-0335855, and/or U.S. patent application Ser. No. 15/492,915, filed Apr. 20, 2017, entitled "Devices for Controlling Computers based on Motions and Positions of Hands" and published as U.S. Pat. App. Pub. No. 2017-0308165 can be used to implement the hand modules (117 and 119), the entire disclosures of which applications are hereby incorporated herein by reference.

FIG. 2 shows a hand module (119) and an arm module (113) as examples. An application for the tracking of the orientation of the torso (101) typically uses at least two arm modules (113 and 115) illustrated in FIG. 1, as further disclosed in U.S. Pat. App. Pub. No. 2018/0335834, entitled "Tracking Torso Orientation to Generate Inputs for Computer Systems", the entire disclosure of which is hereby incorporated herein by reference. Hand modules (117 and 119) can be further used to provide additional inputs and/or for the prediction/calculation of the orientations of the forearms of the user.

Typically, an IMU (e.g., 131 or 121) in a module (e.g., 113 or 110) generates acceleration data from accelerometers, angular velocity data from gyrometers/gyroscopes, and/or orientation data from magnetometers. The microcontrollers (139 and 129) perform preprocessing tasks, such as filtering the sensor data (e.g., blocking sensors that are not used in a specific application), applying calibration data (e.g., to correct the average accumulated error computed by the computing device (141)), transforming motion/position/orientation data in three axes into a quaternion, and packaging the preprocessed results into data packets (e.g., using a data compression technique) for transmitting to the host computing device (141) with a reduced bandwidth requirement and/or communication time.

Each of the microcontrollers (129, 139) can include a memory storing instructions controlling the operations of the respective microcontroller (129 or 139) to perform primary processing of the sensor data from the IMU (121, 131) and control the operations of the communication module (123, 133), and/or other components, such as the LED indicator (137), the haptic actuator (138), buttons and other input devices (125), the display device (127), etc.

The computing device (141) can include one or more microprocessors and a memory storing instructions to implement the motion processor (145). The motion processor (145) can also be implemented via hardware, such as Application-Specific Integrated Circuit (ASIC) or Field-Programmable Gate Array (FPGA).

In some instances, one of the modules (110, 113, 115, 117, and/or 119) is configured as a primary input device; and the other module is configured as a secondary input device that is connected to the computing device (141) via the primary input device. A secondary input device can use the microprocessor of its connected primary input device to perform some of the preprocessing tasks. A module that communicates directly to the computing device (141) is consider a primary input device, even when the module does not have a secondary input device that is connected to the computing device via the primary input device.

In some instances, the computing device (141) specifies the types of input data requested, and the conditions and/or frequency of the input data; and the modules (110, 113, 115, 117, and/or 119) report the requested input data under the conditions and/or according to the frequency specified by the computing device (141). Different reporting frequencies can be specified for different types of input data (e.g., accelerometer measurements, gyroscope/gyrometer measurements, magnetometer measurements, position, orientation, velocity).

In general, the computing device (141) can be a data processing system, such as a mobile phone, a desktop computer, a laptop computer, a head mount virtual reality display, a personal medial player, a tablet computer, etc.

Figure 3:
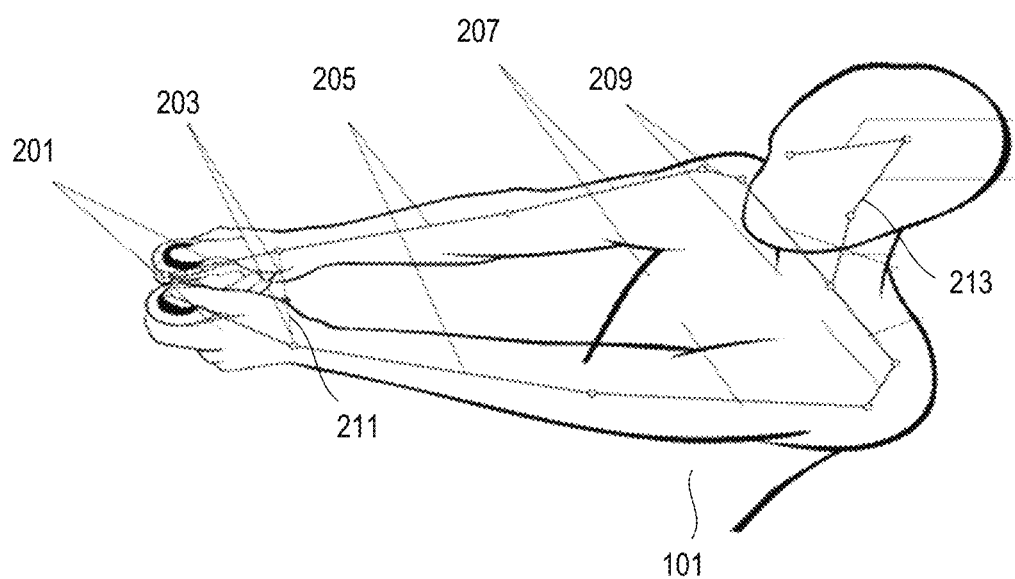
FIG. 3 illustrates geometrical relations used in computing lengths of forearms and upper arms from measurements generated by sensor modules illustrated in FIG. 1.

FIG. 3 shows the geometries used in the calculation of the lengths of the forearms and upper arms using the sensor modules illustrated in FIGS. 1 and 2.

When the user is in a calibration position as illustrated in FIGS. 1 and 3, the forearms (205) and upper arms (207) are arranged in a horizontal plane. The orientations of the line (205) and (209) represent orientations of the arms of the user. The lengths of the line segments (205) and (209) represent lengths of the forearms and upper arms of the user. The hands (203) with handheld controllers (301) are a distance apart in the plane to establish a reference triangle with respect to a reference point (e.g., the center point between shoulders (309)) to determine calculate the distance between the hands (203) and the reference point.

In one embodiment, the Head Mount Display (HMD) (110) illustrated in FIGS. 1 and 2 has a camera (122) which is used to capture the image of the hands (201) in front of the torso (101) of the user in the calibration position. Characteristic points of the hand modules, such as LED lights that are turned on when the image is captured, can be detected in the image to measure the distance between the hand modules and thus the distance (211) between the hands (201), based on which the distance between the hands (203) to the reference point can be computed. In some implementations, the geometrical relations (213) of the head mount display (HMD) (110) relative to the arms and hands are at least partially assumed based on statistical data of typical users and/or corrected via the orientation measurements generated from the IMU installed in the head mount display (HMD) (110). The geometrical relations (213) can be used to convert the measurements of the distance between the hands (203) obtained in the image captured in the camera (122) into the real-world measurement of the distance between the hands (203) to the reference point.

The orientations forearms and upper arms (103 and 105) in the horizontal plane can be determined using measurements of the IMUs of the hand modules (117 and 119) and the arm modules (113 and 115).

Based on the distance between the hands to the reference point and orientations of the forearms and upper arms (103 and 105) in the horizontal plane, the lengths of the forearms and upper arms (103 and 105).

For example, it can be assumed that the forearm and the upper arm (103 and 105) has a predetermined ratio in their lengths. With this assumption, the lengths of the forearms, the upper arms and the shoulder widths can be uniquely determined from the geometric relations illustrated in FIG. 3, using the reference triangle, the length ratio between the forearms and the upper arms, and the orientations of the forearms and the upper arms.

The length calculation can further include the consideration of the horizontal forward offset (209) caused by the shoulder bending forward. The forward offset (209) can be estimated based on the assumption of a maximum angle the shoulders can be pointed forward, and an assumed length of each shoulder. The user would be instructed to point their shoulders forward to the maximum at the calibration pose illustrated in FIGS. 1 and 3.

In an alternative embodiment, when HMD does not have an optical module (e.g., camera (122)), the lengths of the forearms (205) and upper arms (207) can be computed based on average values of lengths. For example, it can be assumed that the user has an upper arm of 0.28 meter, a shoulder of 0.055 meter, a clavicle offset of 0.045 meter, a clavicle half base length 0.105 meter, a neck length of 0.125 meter, and a head length of 0.1 meter. The lengths of the hands and forearms can be calculated based on the assumed lengths.

Figure 4:
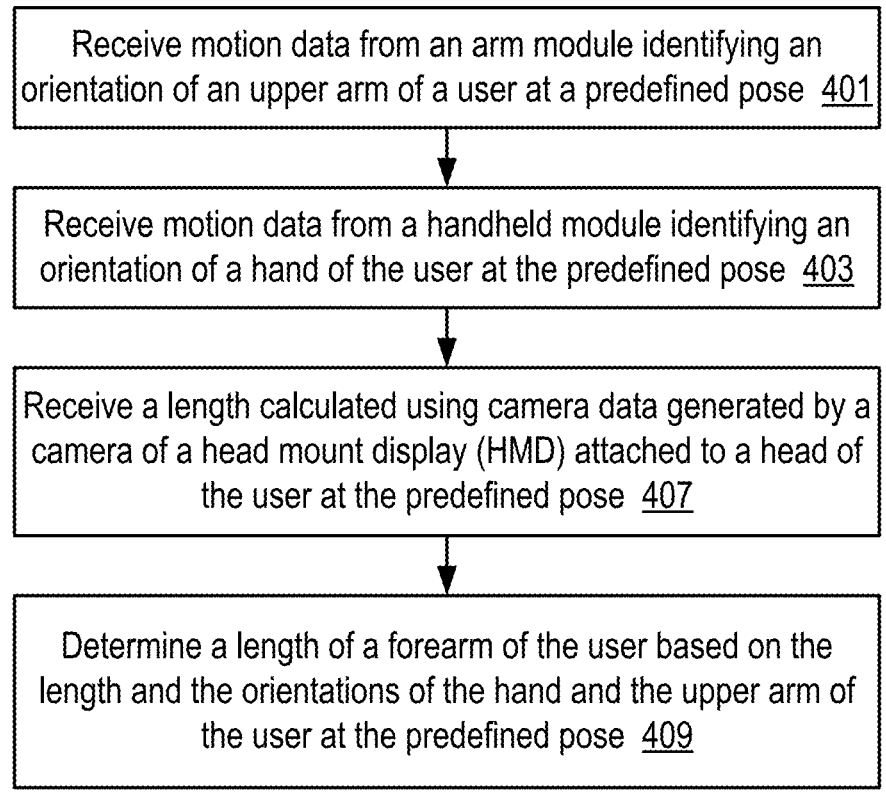
FIG. 4 shows a method to compute the lengths according to one embodiment.

FIG. 4 shows a method to determine bones length based on the length between the hands of the user and user's shoulders, the orientation of the hand of the user, the orientation of the upper arm of the user, and/or the orientation of the head of the user according to one embodiment. For example, the method of FIG. 4 can be implemented in a system illustrated in FIG. 2 with handheld modules (117 and 119), arm modules (113 and 115) and a head module (110) worn by a user in a way illustrated FIG. 1 and using the geometrical relations identified via FIG. 3.

In FIG. 4, a computing device (141): receives (401) motion data from an arm module (113 or 115) identifying an orientation of an upper arm (103 or 105) of a user at a predefined pose (e.g., illustrated in FIGS. 1 and 3); receives (403) motion data from a handheld module (117 or 119) identifying an orientation of a hand (106 or 108) of the user at the predefined pose; receives (407) a length calculated using camera data generated by a camera (122) of a head mount display (HMD) (110) attached to a head (107) of the user at the predefined pose; and determines (409) a length of a forearm (e.g., 301 or 303) of the user based on the length and the orientations of the hand and the upper arm of the user at the predefined pose. For example, the length determined from the camera data can be a distance from a center point between the left hand and the right hand of the user to a center point between a left shoulder and a right shoulder of the user.

Figure 5:
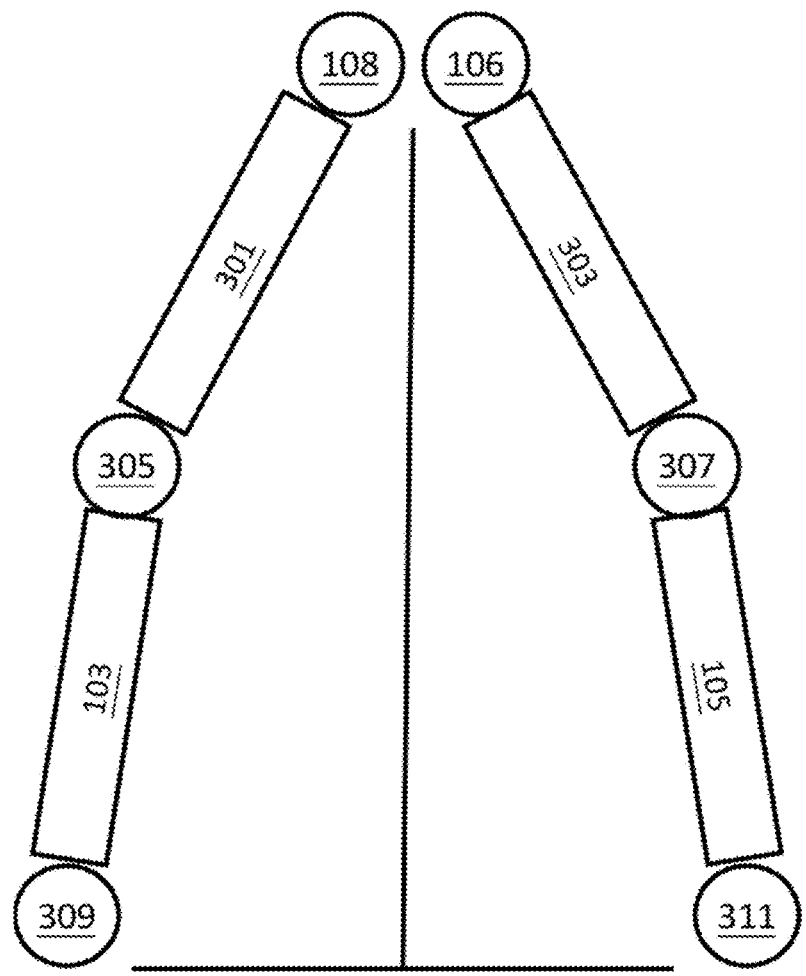
FIG. 5 illustrates a diagram that can be used to formulate the computation lengths of forearms and upper arms according to one embodiment.

FIG. 5 illustrates a diagram that can be used to formulate the computation lengths of forearms and upper arms according to one embodiment. The diagram of FIG. 5 illustrates the positions and orientations of hands (106) and (108), elbow joints (305) and (307), and shoulder joints (309) and (311).

As discussed above, a camera (122) of a HMD (110) can be used to capture image data to measure the distance between the center of hands (106 and 108) and the center of shoulders (309 and 311). IMUs are used to determine the orientation of the hands and upper arms (103 and 105). The forearm (301 and 303) orientations can be computed from the orientations of the hands (106 and 108) and the upper arms (103 and 105) (e.g., using the technique disclosed in U.S. Pat. App. Pub. No. 2018/0335855 or other techniques, or measured using additional IMUs). Optionally, the user can be required to keep the forearms (301 and 303) and upper arms (103 and 105) in a straight line such that the orientations of the forearms (301 and 303) are same as the orientations of the upper arms (103 and 105).

When the orientations of the forearm (303) and the upper arm (105) are known and an assumed length ratio between the forearm (303) and the upper arm (105) is used, the lengths of the forearm (303) and the upper arm (105) can be computed. For example, assuming a unit length for the forearm (303), a corresponding scaled length of the upper arm (305) can be computed from the assumed/predetermined length ratio between the forearm (303) and the upper arm (105. Then, the corresponding scaled distance between the hands (106 and 108) to the center of shoulders (309 and 311) can be calculated from the assumed unit length of the forearm (303), the corresponding scaled length of the upper arm (305) and the orientations of the forearm (303) and upper arm (305). The ratio between the scaled distance between the hands (106 and 108) to the center of shoulders (309 and 311) and the real-world distance between the hands (106 and 108) to the center of shoulders (309 and 311) determined using the camera (122) is the same as the ratio between the assumed unit length of the forearm (303) and the real-world length of the forearm (303). Thus, the real-world length of the forearm (303) can be determined from scaling up the assumed unit length according to the ratio between the scaled distance between the hands (106 and 108) to the center of shoulders (309 and 311) and the real-world distance between the hands (106 and 108) to the center of shoulders (309 and 311). Other formulas can also be used to calculate the lengths of the forearms (301 and 303) and the upper arms (103 and 105) based on the geometry illustrated in FIG. 5, the distance between the hands and the shoulders, and the orientations of the forearms (301 and 303) and the upper arms (103 and 105).

The present disclosure includes methods and apparatuses which perform these methods, including data processing systems which perform these methods, and computer readable media containing instructions which when executed on data processing systems cause the systems to perform these methods.

For example, the computing device (141), the arm module (113) and/or the handheld module (115) can be implemented using one or more data processing systems.

A typical data processing system can include includes an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices can include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory can include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory can also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques can be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments can be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data can be stored in various places including for example ROM, volatile RAM, non-volatile memory and/or cache. Portions of this software and/or data can be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media can store the instructions.

The instructions can also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry can be used in combination with software instructions to implement the techniques. Thus, the techniques are neither limited to any specific combination of hardware circuitry and software nor to any particular source for the instructions executed by the data processing system.

In the foregoing specification, the disclosure has been described with reference to specific exemplary embodiments thereof. It will be evident that various modifications can be made thereto without departing from the broader spirit and scope as set forth in the following claims. The specification and drawings are, accordingly, to be regarded in an illustrative sense rather than a restrictive sense.

What is claimed is:

1. A method, comprising:
   receiving, by a computing device, motion data from a plurality of sensor modules, each module having an inertial measurement unit (IMU) and being attached to a respective body portion of a user at a predefined pose, wherein the predefined pose of the user is representative of forearms and upper arms of the user lying in a horizontal plane;
   receiving, by the computing device, a first length calculated using camera data generated by a camera of a head mount display (HMD) attached to a head of the user at the predefined pose;
   determining, by the computing device, a plurality of orientations based on the motion data at the predefined pose, the plurality of orientations including at least a first orientation of the upper arms of the user; and
   determining, by the computing device, one or more lengths of the user based on the first length and the plurality of orientations at the predefined pose.

2. The method of claim 1, wherein the plurality sensor modules are attached to the user to generate the motion data at the predefined pose.

3. The method of claim 1, wherein the head mount display (HMD) attached to the head of the user includes the camera to generate camera data at the predefined pose.

4. The method of claim 1, wherein the first length is calculated as a distance from a center point between the left hand and the right hand of the user to a center point between a left shoulder and a right shoulder of the user.

5. The method of claim 1, wherein the plurality of orientations include at least a second orientation of the forearms of the user.

6. The method of claim 1, wherein the one or more lengths of the user include the length of the forearms of the user.

7. The method of claim 1, wherein the one or more lengths of the user include the length of the upper arms of the user.

8. A system, comprising:
   one or more processors; and a non-transitory computer-readable medium including one or more sequences of instructions that, when executed by the one or more processors, causes:

receiving, by a computing device, motion data from a plurality of sensor modules, each module having an inertial measurement unit (IMU) and being attached to a respective body portion of a user at a predefined pose;

receiving, by the computing device, a first length calculated using camera data generated by a camera of a head mount display (HMD) attached to a head of the user at the predefined pose;

determining, by the computing device, a plurality of orientations based on the motion data at the predefined pose, the plurality of orientations including at least a first orientation of upper arms of the user; and determining, by the computing device, one or more lengths of the user based on the first length and the plurality of orientations at the predefined pose.

9. The system of claim 8, wherein the predefined pose of the user is representative of the forearms and the upper arms of the user lying in a horizontal plane.

10. The system of claim 8, wherein the plurality sensor modules are attached to the user to generate the motion data at the predefined pose.

11. The system of claim 8, wherein the head mount display (HMD) attached to the head of the user includes the camera to generate camera data at the predefined pose.

12. The system of claim 8, wherein the first length is calculated as a distance from a center point between the left hand and the right hand of the user to a center point between a left shoulder and a right shoulder of the user.

13. The system of claim 8, wherein the plurality of orientations includes at least a second orientation of forearms of the user.

14. The system of claim 8, wherein the one or more lengths of the user include the length of forearms of the user.

15. The system of claim 8, wherein the one or more lengths of the user include the length of upper arms of the user.

16. A non-transitory computer storage medium storing instructions which, when executed by a computing device, instructs the computing device to perform a method, the method comprising:

receiving, by the computing device, motion data from a plurality of sensor modules, each module having an inertial measurement unit (IMU) and being attached to a respective body portion of a user at a predefined pose;

receiving, by the computing device, a first length calculated using camera data generated by a camera of a head mount display (HMD) attached to a head of the user at the predefined pose;

determining, by the computing device, a plurality of orientations based on the motion data at the predefined pose, the plurality of orientations including at least a first orientation of upper arms of the user; and determining, by the computing device, one or more lengths of the user based on the first length and the plurality of orientations at the predefined pose.

17. The non-transitory computer storage medium of claim 16, wherein the predefined pose of the user is representative of the forearms and the upper arms of the user lying in a horizontal plane.

18. The non-transitory computer storage medium of claim 16, wherein the plurality sensor modules are attached to the user to generate the motion data at the predefined pose.

19. The non-transitory computer storage medium of claim 16, wherein the one or more lengths of the user include the length of forearms of the user.

* * * * *